US007379593B2

(12) United States Patent
Fan et al.

(10) Patent No.: US 7,379,593 B2
(45) Date of Patent: May 27, 2008

(54) METHOD FOR IMAGE SEGMENTATION FROM PROVED DETECTION OF BACKGROUND AND TEXT IMAGE PORTIONS

(75) Inventors: Zhigang Fan, Webster, NY (US); Stuart A. Schweid, Pittsford, NY (US); Martin Edward Banton, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 394 days.

(21) Appl. No.: 11/313,980

(22) Filed: Dec. 21, 2005

(65) Prior Publication Data

US 2007/0140571 A1    Jun. 21, 2007

(51) Int. Cl.
*G06K 9/34* (2006.01)
(52) U.S. Cl. .................. 382/173; 382/171; 382/175; 382/274; 382/232; 382/190
(58) Field of Classification Search ............... 382/173, 382/176, 165, 166, 167, 190, 232, 274, 171, 382/175, 164; 358/1.9, 448, 539, 550, 453, 358/462
See application file for complete search history.

(56) References Cited

U.S. PATENT DOCUMENTS

| 5,767,978 | A   |   | 6/1998 | Revankar et al. |         |
|-----------|-----|---|--------|-----------------|---------|
| 7,184,589 | B2  | * | 2/2007 | Okubo           | 382/166 |
| 7,327,882 | B2  | * | 2/2008 | Wang et al.     | 382/181 |

OTHER PUBLICATIONS

U.S. Appl. No. 10/866,850, filed, Jun. 14, 2003, Z. Fan.

* cited by examiner

*Primary Examiner*—Matthew C. Bella
*Assistant Examiner*—Ali Bayat
(74) *Attorney, Agent, or Firm*—Fay Sharpe LLP

(57) ABSTRACT

A method is provided for segmenting scanned image data in accordance with mixed raster content processing, further including windowing for purposes of extracting particularly classifiable objects, i.e., text, graphics or pictures. Application of predetermined parameter sets selected for more precise identification of the extracted objects are applied to the data for object extraction, object selection, color uniformity, and clustering for coloring similarity. A page background detection feature uses dual thresholding for segregating text (darker) areas from non-text (brighter) areas. Two histograms are created for the respective areas. Thresholds are generated from the two histograms and applied to the respective areas separately.

14 Claims, 7 Drawing Sheets

METHOD FOR IMAGE SEGMENTATION FROM PROVED DETECTION OF BACKGROUND AND TEXT IMAGE PORTIONS

The subject development relates generally to image segmentation, and more particularly to a method to process scanned data representative of a document image wherein background and text portions of the image are better detected for achieving high reconstructed image quality.

BACKGROUND

The present exemplary embodiments are directed to methods for image segmentation to produce a mixed raster content ("MRC") image with multiple extracted constant color areas ("MECCA"). MRC modeling is a powerful image representation concept in achieving high compression ratios while maintaining high-constructed image quality. MECCA modeling has the further advantages of relatively undemanding decomposition requirements and inherent text enhancement and noise reduction features. The MECCA model contains one background layer, N foreground layers, and N mask layers where N is a non-negative integer. While the background layer can be a contone bitmap, the foreground layers are restricted to constant colors. U.S. Ser. No. 10/866,850 entitled "Method for Image Segmentation to Identify Regions with Constant Foreground Color", filed Jun. 14, 2003 hereby incorporated by reference in its entirety, details a relevant MECCA modeling method.

To generate MRC/MECCA representation for an image, segmentation is required. The segmentation algorithm generally consists of four steps, namely object extraction, object selection, color clustering, and result generation. In the first step, text and other objects are extracted from the image. Next, the objects are tested for color constancy and other features to decide if they should be represented in the foreground layers. The objects that are chosen are then clustered in color space as the third step. The image is finally segmented such that each foreground layer codes the objects from the same color cluster.

Windowing is another concept in document image segmentation. Windowing partitions the page into different regions that are separated by background borders. Windowing first identifies the page background that separates different text objects and windows. The windows are classified as pictorial and graphical (called "composite"). The graphical windows are further recursively processed. The local background of a graphical window is detected. The text and windows (within a window) are separated by the local background. The windows (within a window) are classified. The process repeats until all the objects are separated.

There is a need for a windowing that can be applied as a part of MRC/MECCA segmentation. It extracts text and other details as the objects, which are the candidates that are to be coded in foreground layers.

Page background detection is typically a first step for scanned document image segmentation. The detected background can then be applied for separating different objects in the page including text characters, pictures and graphics. Page background detection may also be useful for applications like background enhancement. Most existing page background detection methods are based on global thresholding. Specifically, a threshold is first determined using some statistics extracted from a global histogram of the pixel intensities. The threshold is then applied to every pixel on the page. The above approach typically generates reasonable results, but it may fail in the text regions, and other regions where the background neighbors dark objects. Quite often, the background in the text (and darker) regions has a different statistic distribution than the one in the open white areas. It tends to be darker for many reasons, e.g. ICE (Integrated Cavity Effect) and JPEG ringing artifacts (some scanned images are lightly JPEG compressed to reduce file size and/or bandwidth, the ringing introduced may not be visible as the compression is light, but could be strong enough to change the page background detection results). Errors in background detection could be harmless for applications like background enhancement, but may introduce severe artifacts for other applications such as to segment for the MRC/MECCA model. If the threshold is globally lowered (hence more areas will be detected as background), the problem can be avoided. However, there is a risk to misclassify the light non-background arrears, such as picture regions, as background. Local thresholding methods exist for separating text and background. They rely on local statistics to establish threshold. They can effectively extract text and other small details and thus are suitable for applications like OCR. But they are not able to find large objects like pictorial windows and are generally not applicable for page background detection. For example, for text on a color background, they typically classify them as "text" and "background", while in our case, both should be classified as "non-page background". In addition, local thresholding methods typically demand much more computation.

The segmenting of the data into either background or text is important because different compression algorithms are much more efficient for different kinds of images. For example, JPEG is a more efficient compression algorithm for pictures while other algorithms are especially designed for binary images like text. Using different compression algorithms for different portions of the scanned image data provides the advantage of a high compression ratio for the data with high quality image reconstruction.

Accordingly, there is a need for better segmenting of scanned image data that can more accurately identify background and text data within the scanned image data.

SUMMARY

An MRC/MECCA segmentation method is provided which more extensively exploits windowing information. More particularly, the image is partitioned into background and different windows. Each window is classified as either pictorial or graphical. Such windowing classification optimizes decision making and parameter selection within the segmentation method.

In accordance with the present embodiments a page background detection method is also disclosed based on a dual threshold scheme. Two histograms are created, one from the text (and darker) areas and the other from the non-text (and brighter) areas. A pixel contributes to the text histogram if there is a dark pixel in its neighborhood, otherwise, it contributes to the white area histogram. Two thresholds are generated from the two histograms and are applied to the text regions and the non-text regions, separately. Such a detection method can cleanly separate text and background without sacrificing light picture regions.

Accordingly, a method is provided for processing scanned data representative of a document image comprising segmented data for achieving high compression ratios with improved reconstruction image quality. The method comprises segmenting the scanned data into background and foreground layers. The foreground layer of the scanned data is then windowed into a plurality of windows where each of the windows includes a selected region identifiable as contiguous to the background layer data. Objects are extracted from the plurality of windows where the objects comprise text, graphical and pictorial objects, each identifiable by a contrast distinctiveness relative to the background layered data. A text object is indicated by a relatively lowest level contrast, a graphical object by a next level of contrast and a pictorial object by relatively highest level of contrast, respective level of contrast being defined by pre-selected thresholds.

The segmenting of the background layer comprises creating a plurality of histograms representative of pixel intensities wherein one of the histograms is representative of text in darker areas of the scanned image and another of the histograms is representative of non-text (brighter) areas of the scanned data. Different threshold values are applied to the histograms for identifying the page background layers therein.

DETAILED DESCRIPTION

The subject developments relate to segmenting scanned data for achieving improved high compression ratios and good reconstruction image quality. As noted above, different types of scanned data can be more efficiently compressed in accordance with different types of compression algorithms. The slowly varying scanned image data portions (pictures) of the image are better compressed by picture compression algorithms like JPEG. The transition areas are better compressed by binary compressors. Accordingly, the segmentation process is basically to segment the image into several layers where the layers carrying slowly varying information are compressed by picture compressors, while the layers carrying the sharp transitions are compressed by binary compressors.

The subject developments of this application primarily relate to "windowing" of the scanned image data and a dual thresholding technique for identification of page background layer detection. The subject windowing relates to using the page background, typically the paper white portions, to separate objects on a page. By object is meant some text or character, a graphical representation, or a pictorial representation. By identifying the type of object data within the window, and processing it in the manner to more accurately identify foreground layer data within the window from background data, data segmentation is more efficiently accomplished and the data can be more efficiently compressed and more accurately reconstructed. The principal objective is to accurately segregate the text material as a foreground layer distinct from other object data. For example, if the image data comprises a picture including some text, it is important that the text not be confused with non-text small objects in the picture, which based merely upon pixel intensity may look very similar to text.

Figure 2:
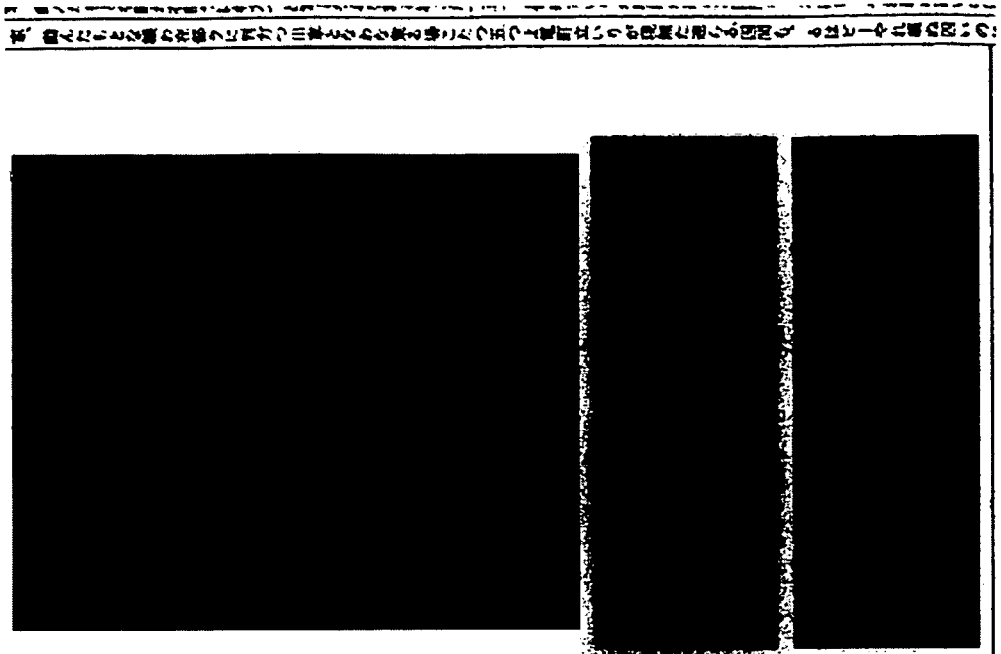
FIG. 2 illustrates a conventional method processing technique which generates a nonacceptable identification of the page background layer.
Figure 1:
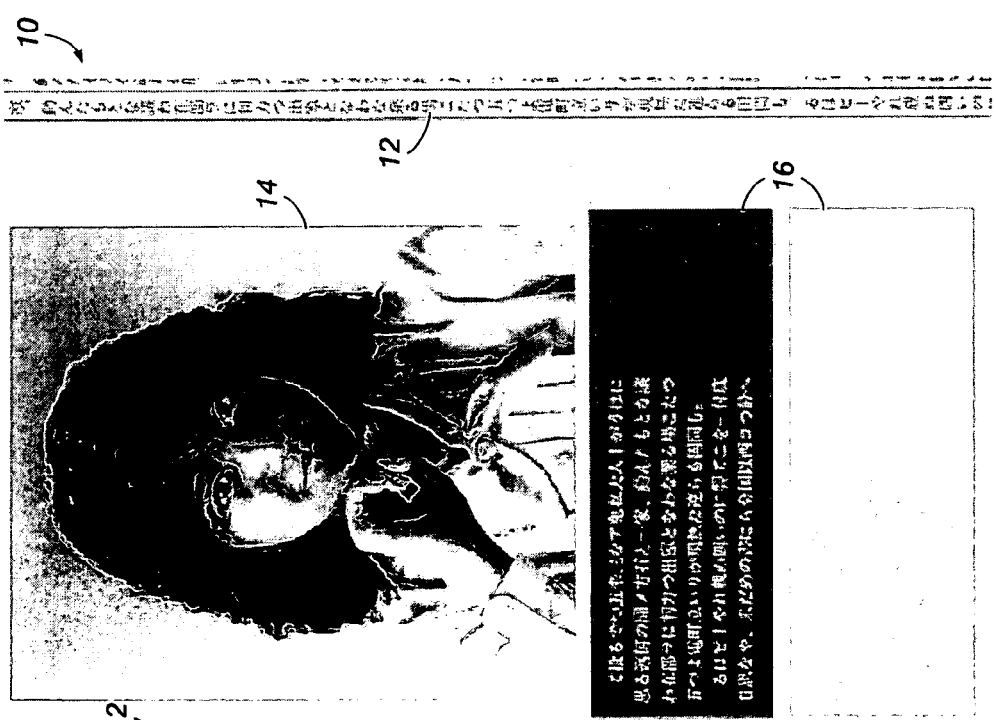
FIG. 1 is a representation of an original image which is to be processed for segment identification and in particular page background detection.
Figure 4:
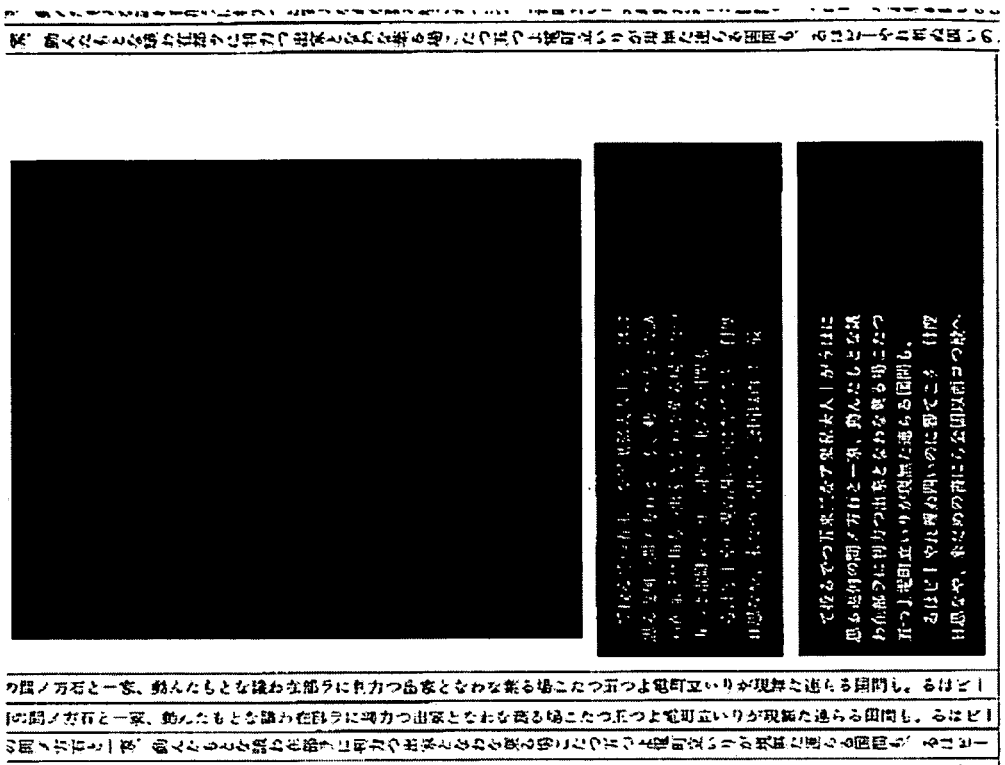
FIG. 4 is an illustration of the high quality reconstruction image results for page background reconstruction in accordance with the subject methods.
Figure 3:
FIG. 3 comprises an illustration of the results of an alternative segmenting method also generating unacceptable results.

With particular reference to FIG. 1, the image 10 is comprised of text data 12, pictorial data 14 and graphical data 16. It can be seen that all of these portions of the image are bordered by white page background. FIG. 2 illustrates the problems that can occur with prior background detection methods, wherein a single threshold value is applied based upon a global thresholding of the histogram of pixel data. In this case, the separation of areas between text and white page background is not very clean due to dark neighborhood pixels within the region of the text. The applied threshold value is too high to distinguish sharply the page background area in such portions. Alternatively, if the global thresholding is lowered to enhance page background detection, then the whiter areas 20 of the pictorial data can be confused as a background layer. However, contrasting the reconstructed image of FIG. 4 with FIGS. 2 and 3 evidences that the subject method provides a much higher quality reconstruction of the white background layer and hence a clear and sharper text portion.

Figure 5:
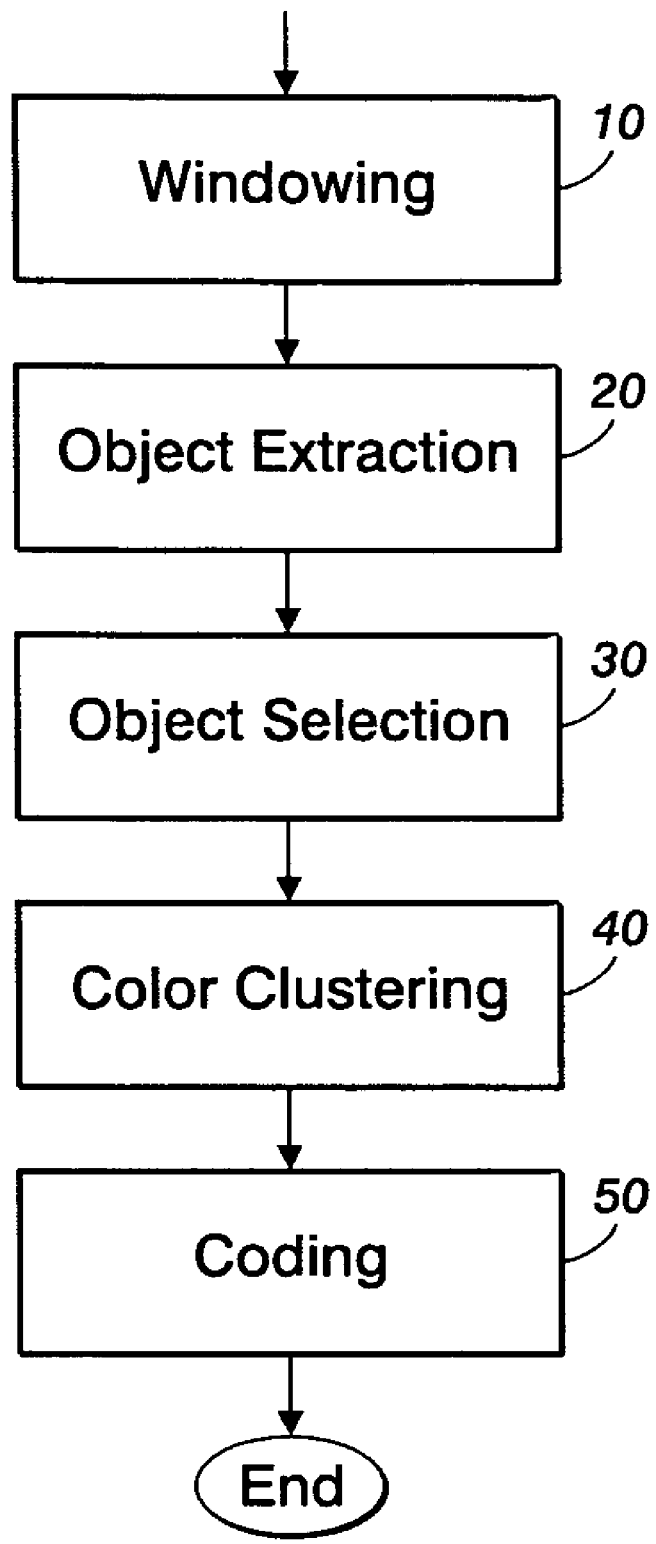
FIG. 5 is a flowchart illustrating processing steps for image segmentation in accordance with the subject developments based on windowing information.

With particular reference to FIG. 5, the subject development comprises an MRC/MECCA segmentation method that more extensively exploits windowing information. With particular reference to FIG. 5, the windowing 10 is combined with object extraction 20, object selection 30, color clustering 40 and coding 50.

The windowing 10 comprises dividing the image into a plurality of blocks. As noted above each window comprises a partitioning of the page into different regions that are separated by backgrounds. Accordingly, the image is partitioned into background and different windows for the purpose of classifying windows as either pictorial or graphical. As will be noted below, the classified windows can be exploited for optimizing decision making and parameter selection processes in the object extraction 20, the object selection 30, the color clustering 40 and the result generation (coding) 50 steps.

Figure 6:
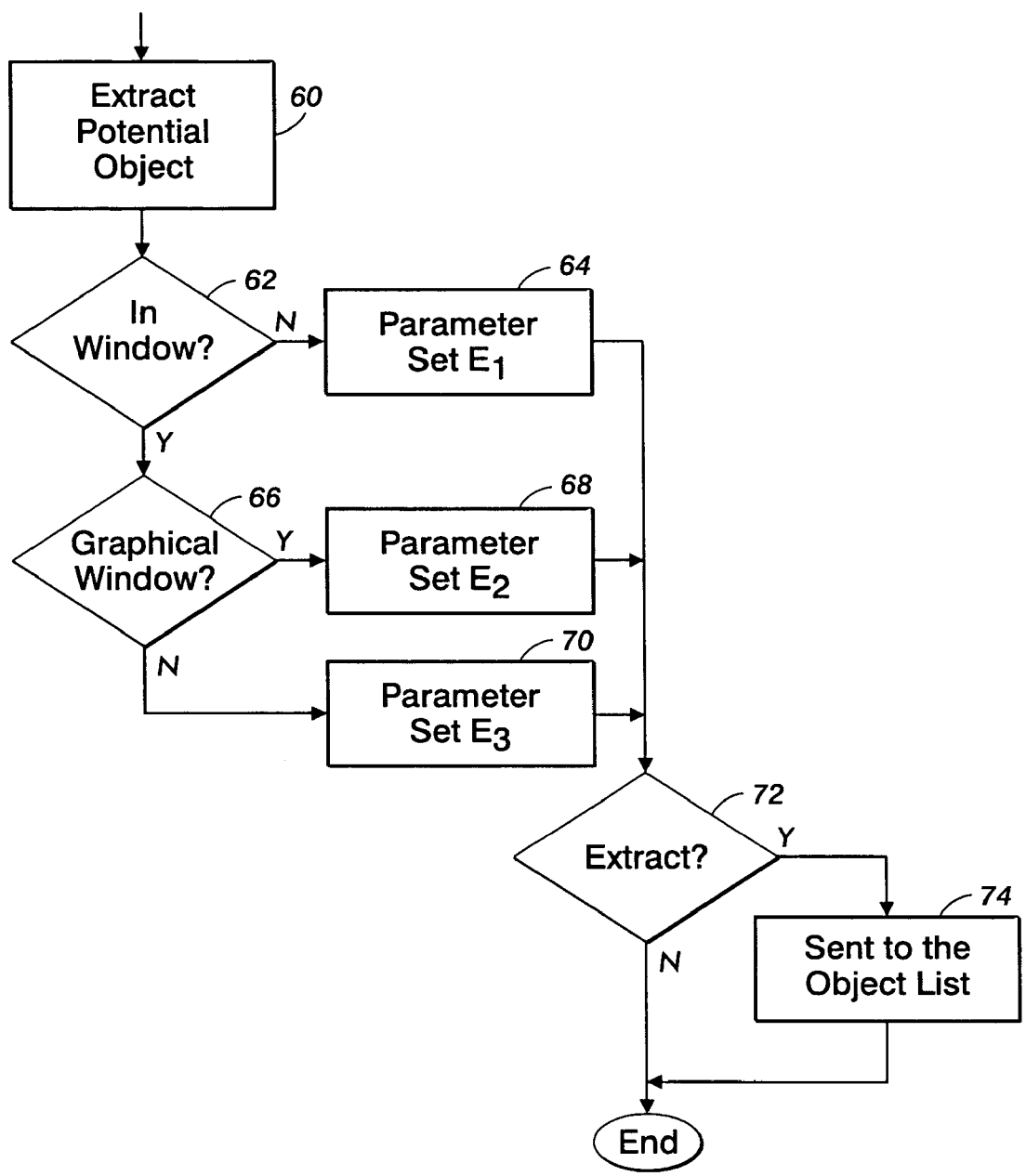
FIG. 6 is a flowchart more particularly identifying the processing steps of the object extraction step of FIG. 5.
Figure 7:
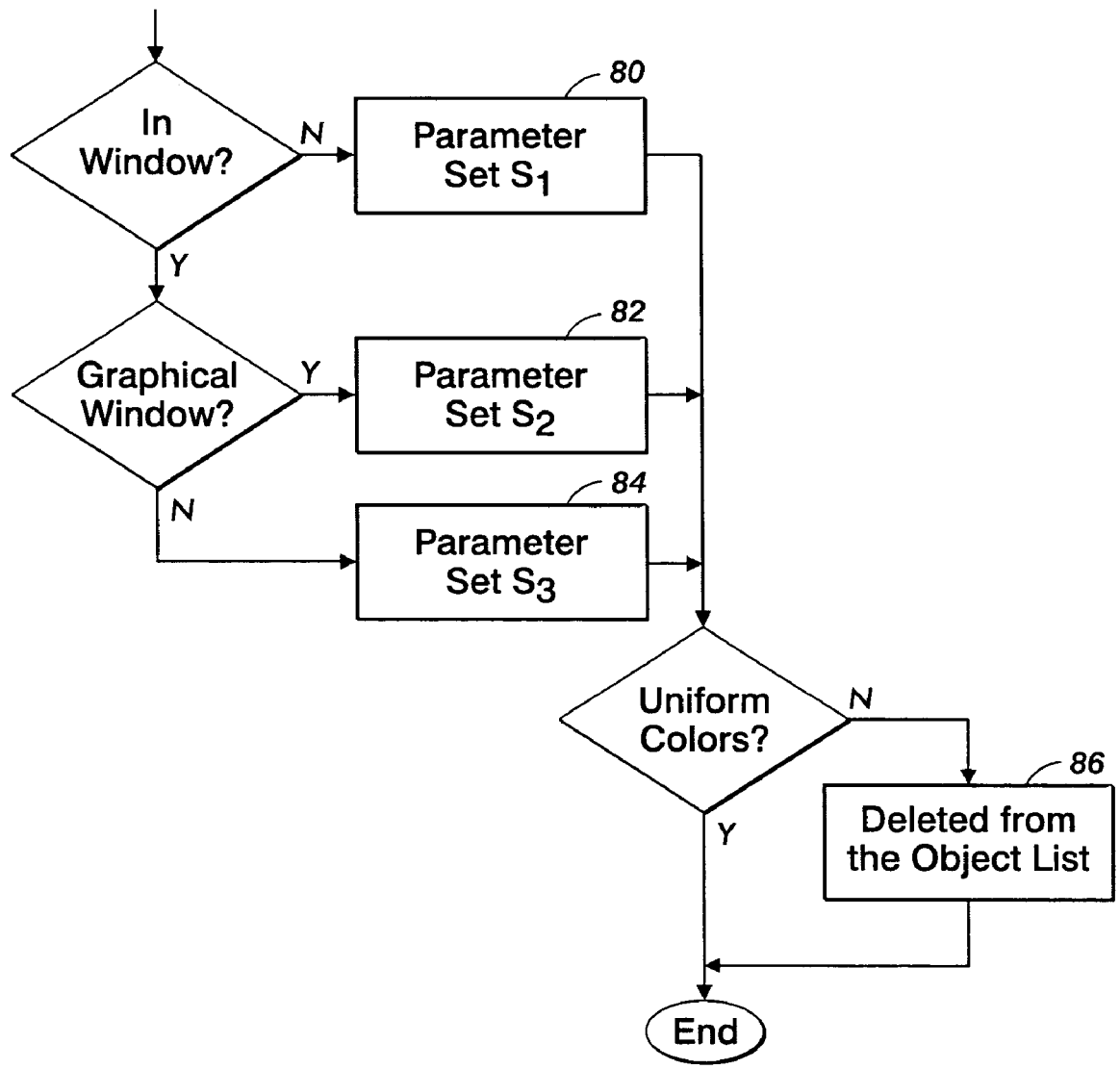
FIG. 7 is a flowchart more particularly identifying the processing steps of the objects of the election step of FIG. 5.

With reference to FIG. 6, during object extraction 20, strong contrasts (between the object and its surroundings) are required for an object to be extracted. A more strict condition (stronger contrast) is imposed in pictorial windows than in background and graphical windows. This is due to the fact that noise is more likely in the pictorial windows. A stronger contrast requirement reflects this a priori knowledge. Accordingly, candidate data comprising a potential object is extracted 60. If it is not in a window comprising a graphical or pictorial data, then it is considered for identification as a text object and a first parameter set E1 64 is applied to distinguish the text object from background layer data. The parameter set E1 64 comprises the relatively lowest level of contrast indication. If the object is in one of the graphical or pictorial windows 62, then a determination must be made if the object is in a graphical window 66, and a second parameter set E2 68 is applied for identifying graphical objects within the window in contrast to the background layer data. The parameter set E2 68 is identified by a next level contrast higher than the parameter set E1. If the object is in a pictorial window, then parameter set E3 70 is applied comprising the relatively highest level contrast. The parameter set values E1, E2, E3 are predetermined based upon empirical data. For those objects that can be extracted 72 by the application of the applied parameter sets, they are sent 74 to the appropriately classified object list. All the contrast measurements are dependent upon the surroundings of a particular subject object. By "surroundings" it is intended to mean neighborhood pixels.

In object selection, the objects are examined for color uniformity. Only the uniform objects are further considered as candidates for the foreground layers. Again, different criterions are applied for text, graphical and pictorial data. The threshold for passing the selection test is set high (more difficult) for objects in pictorial windows. More particularly, selection parameters S1 is applied 80 for data not in the window, i.e., candidate text data, which parameter set S1 represents a relatively lowest level of color uniformity. Application of a second parameter set S2 is made 82 for graphical objects within the window. A third parameter set S3 is applied 84 to pictorial window data. The color uniformity graph parameter set S3 is higher than parameter set S2, which is higher than the lowest parameter set S1. Again, the parameter sets are predetermined based upon empirical data. If upon application of the parameter sets it is determined that the candidate object lacks color uniformity, then it is deleted 86 from object selection as a foreground layer.

Figure 8:
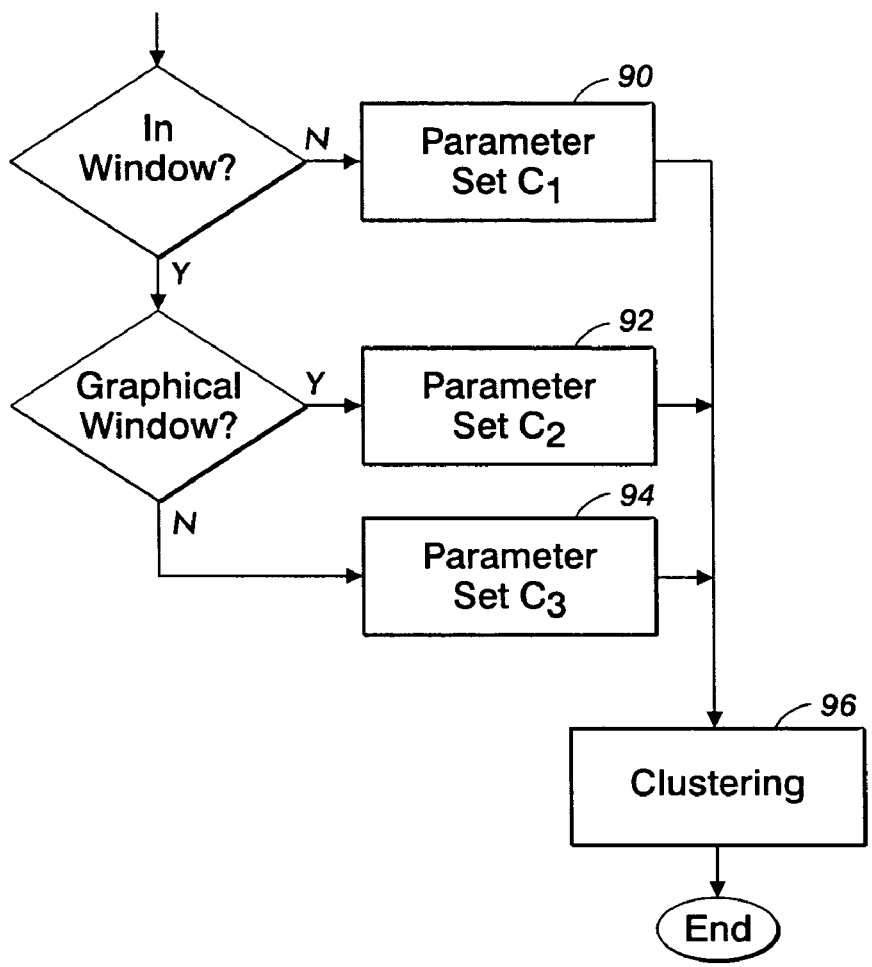
FIG. 8 is a flowchart more particularly identifying the processing steps of the color clustering step of FIG. 5.

In color clustering, FIG. 8, the objects are grouped such that within each group, the objects have similar color. The clustering is performed first within the same window, then among the windows of the same type. The objects from different kinds of windows remain in different clusters. Small clusters (a cluster that has very objects) in the pictorial windows are discarded (coded as background), as they often represent noise. More particularly, three distinct clustering parameter sets are also applied to the candidate object. For candidate objects outside the window, i.e. text objects, application 90 of a first cluster parameter readings set C1 is made wherein the threshold for determining that the object of a similar color is at a relatively lowest level. For graphical objects, a second parameter set C2 is applied 92 for identifying graphical objects within the window. Lastly, a third parameter set C3 is applied for candidate pictorial objects wherein the threshold for color uniformity is set at a highest level. Those objects that can be clustered as having a similar color are then appropriately clustered 96.

Figure 9:
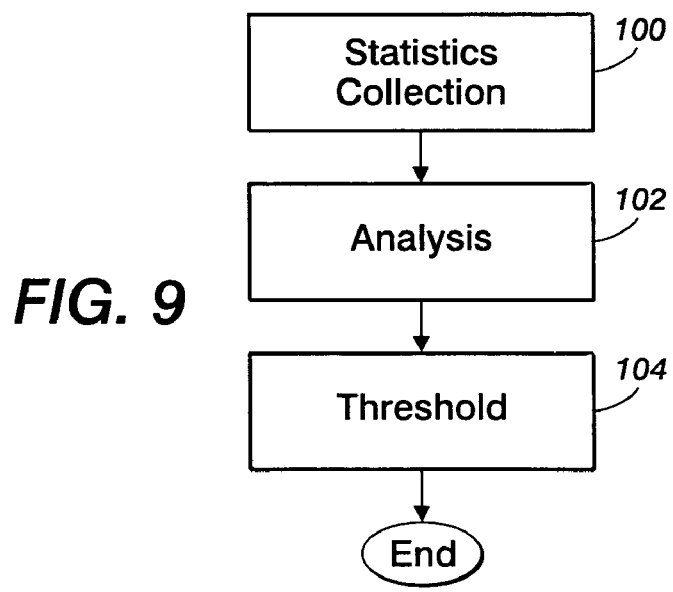
FIG. 9 is a flowchart generally showing the processing steps for a page background detection method using dual thresholding.
Figure 10:
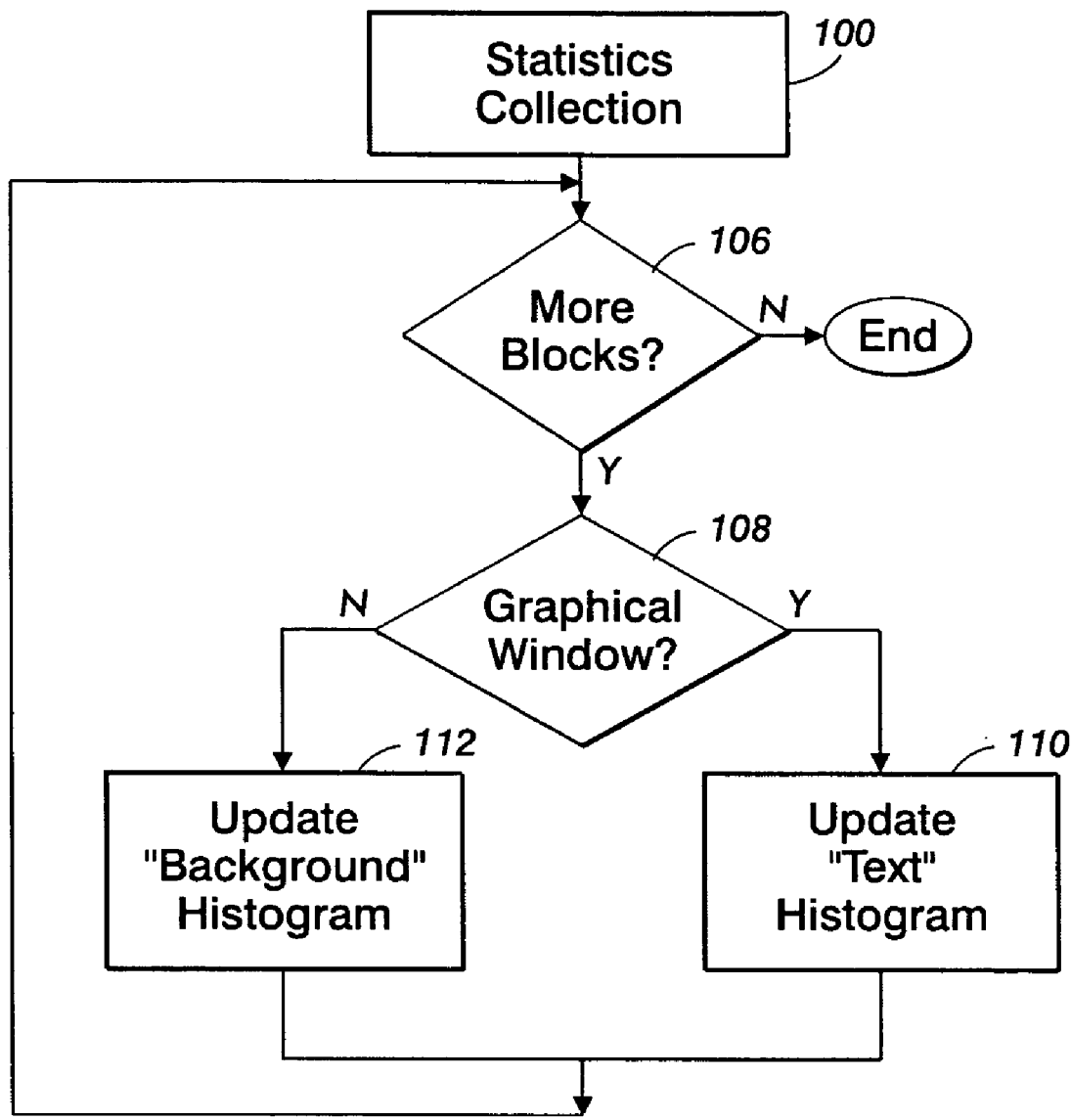
FIG. 10 is a flowchart more particularly identifying the processing steps of the statistics collection step of FIG. 9.

With reference to FIGS. 9 and 10, another feature of the present embodiments is illustrated with regard to a page background detection method using dual thresholding. Two histograms are created, one from the text (and darker) areas and the other from the non-text (and brighter) areas. A pixel contributes to the text histogram if there is a dark pixel in its neighborhood (i.e., within a predetermined surrounding area). Otherwise, it contributes to the white area histogram. Two thresholds are generated from the two histograms, and are applied to the text (darker) regions and the non-text (brighter) regions separately. The histograms are created for collecting 100 statistics from the background areas or blocks or the text areas or blocks, respectively. The statistics are analyzed 102 to derive 104 thresholds from the histograms.

With reference to FIG. 10, in one embodiment, the subject method comprises dividing the image into disjoint blocks. A block is considered to be a "background" block if all the pixel intensities are greater than a predetermined value. Otherwise, the block is classified as "text block". As candidate blocks are identified 106, they are examined to determine if the block contains black pixels 108. If yes, then the first threshold is applied for updating 110 the text histogram to include text data identified by the text threshold. If no, then the block is used to update 112 the background histogram based upon application of the second threshold value.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for processing scanned data representative of a document image comprising segmenting the data for achieving high compression ratios with improved reconstructed image quality, comprising:
   segmenting the scanned data into background and foreground layers;
   windowing the scanned data comprising foreground layer candidate data into a plurality of windows, wherein each of the windows includes a selected region identifiable as contiguous to background layer data;
   extracting objects from the plurality of windows wherein the objects comprise text, graphical and pictorial objects; and,
   classifying the object based on imposition of predetermined contrast levels between the object and object surroundings.

2. The method of claim 1 wherein the segmenting of the background layer comprises creating a plurality of histograms representative of pixel intensities wherein a one of the histograms is representative of text and darker areas of the scanned data, and an other of the histograms is representative of non-text and brighter areas of the scanned data.

3. The method of claim 2 wherein the creating of the histograms comprises identifying a pixel as part of the one histogram representative of text if a dark pixel exists in a neighborhood of the pixel.

4. The method of claim 3 wherein the creating comprises identifying an other pixel as part of other histogram representatives of non-text if no dark pixel exists in a neighborhood of the other pixel.

5. The method of claim 2 further comprising applying a first threshold value to the one histogram for identifying the page background layer.

6. The method of claim 5 further comprising applying a second threshold value to the other histogram for identifying the page background layer.

7. The method of claim 1 wherein the segmenting of the background layer comprises dividing the scanned data into a plurality of disjoint blocks and identifying the block as background if all pixel intensities therein are less than a pre-determined value.

8. The method of claim 7 further comprising creating histograms for the background blocks and the text blocks, respectively.

9. The method of claim 8 further comprising determining threshold values indicative of the background layer from the histograms for the background blocks and the text blocks.

10. The method of claim 9 further comprising applying the threshold values to the background blocks and text blocks for identifying the page background layer.

11. The method of claim 1 wherein the classifying comprises identifying the text, graphical and pictorial objects by contrast distinctiveness relative to the background layer data and wherein a text object is indicated by a relatively lowest level contrast, a graphical object by a next level contrast, and a pictorial object by a relatively highest level contrast, the respective level contrasts being defined by preselected thresholds.

12. The method of claim 11 wherein the extracting objects is based on an extraction parameter set including a first text set for identifying text objects relative to the background layer, a second graphical set for identifying graphical objects relative to the background layer, and a third pictorial set for identifying pictorial objects relative to the background layer.

13. The method of claim 1 further including selecting objects for color uniformity based upon a selection parameter set including a first text set for identifying text objects relative to the background layer, a second graphical set for identifying graphical objects relative to the background layer, and a third pictorial set for identifying pictorial objects relative to the background layer.

14. The method of claim 1 further including clustering objects having similar color based on clustering parameter sets respectively associated with text, graphical and pictorial objects.

* * * * *